J. SZUNYIK.
KETTLE.
APPLICATION FILED JUNE 6, 1913.
1,089,164.
Patented Mar. 3, 1914.
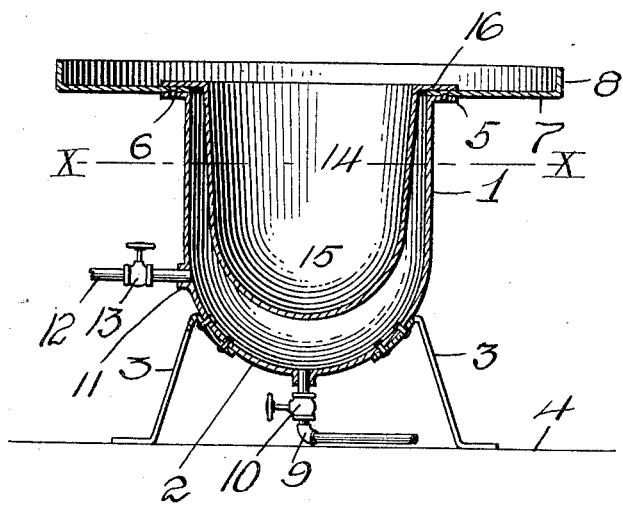
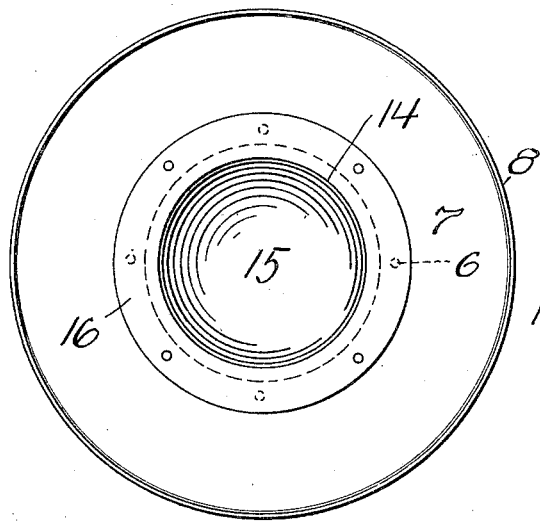
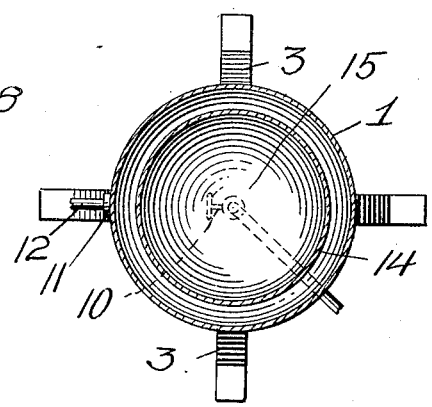
WITNESSES
Samuel Payne.
Karl H. Butler
INVENTOR
J. Szunyik.
By Henry C. Evert
ATTORNEY

UNITED STATES PATENT OFFICE.

JOZSEF SZUNYIK, OF DORCHESTER, VIRGINIA.

KETTLE.

1,089,164. Specification of Letters Patent. Patented Mar. 3, 1914.

Application filed June 6, 1913. Serial No. 772,176.

*To all whom it may concern:*

Be it known that I, JOZSEF SZUNYIK, a subject of the King of Hungary, residing at Dorchester, in the county of Wise and State of Virginia, have invented certain new and useful Improvements in Kettles, of which the following is a specification, reference being had therein to the accompanying drawing.

This invention relates to kettles, and the primary object of my invention is to provide a double kettle that can be readily used out-of-doors as a double boiler for par-boiling and preparing various kinds of food.

Another object of this invention is to provide a double boiler with a novel apron that prevents over boiled food or food that has been removed from the kettle from being wasted.

A further object of this invention is to provide a simple, durable and inexpensive kettle that has provision for admitting water to the kettle and drawing off the same.

I attain the above and other objects by a mechanical construction that will be hereinafter specifically described and then claimed, and reference will now be had to the drawing, wherein:—

Figure 1 is a vertical sectional view of the kettle, Fig. 2 is a plan of the same, and Fig. 3 is a horizontal sectional view of the kettle on line X—X Fig. 1.

In the drawing 1 denotes a cylindrical kettle having a rounded or semi-spherical bottom 2 provided with angularly disposed legs 3 whereby the kettle can be supported in an elevated position relatively to the ground 4 or other support. The upper edges of the kettle 1 have an annular flange 5 and riveted or otherwise secured to said flange is an annular apron 7 having a vertical wall 8. The bottom 2 of the kettle is provided with an outlet or drain pipe 9 having a conventional form of globe valve 10.

The side of the kettle 1, adjacent to the bottom thereof, has a boss 11 for a water inlet pipe 12, said pipe having an ordinary globe valve 13. It is through the medium of the pipes 12 and 9 that water can be supplied to the kettle and drained therefrom.

Detachably mounted in the kettle 1 and spaced from the walls thereof is a cylindrical receptacle 14 having a rounded bottom 15, said receptacle conforming very much to the shape of the kettle 1. The upper edges of the receptacle 14 have an annular flange 16 that rests upon the apron and supports the receptacle 14 within the kettle.

The apron 7 serves as a support for products prior to placing the same in the receptacle 14, also as a support for cooked products removed from the receptacle.

The uses of the kettle are many, and while in the drawing there is illustrated a preferred embodiment of the invention, it is to be understood that the structural elements are susceptible to such variations and modifications as fall within the scope of the appended claim.

What I claim is:—

A kettle having a rounded bottom, legs supporting said kettle in an elevated position, a drain pipe connected to the bottom of said kettle and provided with a valve, a water inlet pipe connected to the side of said kettle and provided with a valve, an annular apron secured to the upper edges of said kettle and having a vertical wall at the outer edges thereof, and a receptacle arranged in said kettle and spaced from the walls thereof, said receptacle having an annular flange adapted to rest upon said apron and support said receptacle in said kettle.

In testimony whereof I affix my signature in the presence of two witnesses.

JOZSEF SZUNYIK.

Witnesses:
MIKE FEKETE,
J. D. ALEXANDER, Jr.